US009218755B2

(12) United States Patent
Chapman et al.

(10) Patent No.: US 9,218,755 B2
(45) Date of Patent: Dec. 22, 2015

(54) DIRECTION ACTIVE PROJECTION

(71) Applicant: Avery Dennison Corporation, Pasadena, CA (US)

(72) Inventors: Steven R. Chapman, Glenview, IL (US); Feng Wu, Lake Zurich, IL (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/760,958

(22) Filed: Feb. 6, 2013

(65) Prior Publication Data

US 2013/0214688 A1 Aug. 22, 2013

Related U.S. Application Data

(60) Provisional application No. 61/595,261, filed on Feb. 6, 2012.

(51) Int. Cl.

| | |
|---|---|
| ***G09F 11/04*** | (2006.01) |
| ***G06F 3/038*** | (2013.01) |
| ***G09G 3/00*** | (2006.01) |
| ***G08G 1/095*** | (2006.01) |
| ***G09F 13/04*** | (2006.01) |
| ***H05B 37/02*** | (2006.01) |

(52) U.S. Cl.
CPC ................ *G09F 13/04* (2013.01); *G08G 1/095* (2013.01); *H05B 37/02* (2013.01)

(58) Field of Classification Search
CPC ............. H05B 39/042; H05B 41/3922; H05B 41/325; Y02B 20/14; G03B 20/14
USPC ............ 315/158, 151, 291; 345/204, 207, 32; 40/541
See application file for complete search history.

(56) References Cited

U.S. PATENT DOCUMENTS

| | | | | |
|---|---|---|---|---|
| 4,807,092 | A | 2/1989 | Hasegawa | |
| 6,045,230 | A * | 4/2000 | Dreyer | B44F 1/045 359/518 |
| 6,119,380 | A * | 9/2000 | Inbar | 40/361 |
| 6,282,026 | B1 * | 8/2001 | Dreyer | G02B 5/124 359/518 |
| 8,269,753 | B2 * | 9/2012 | Matsuki | 345/207 |
| 2002/0089419 | A1 | 7/2002 | Martineau | |

(Continued)

FOREIGN PATENT DOCUMENTS

| | | |
|---|---|---|
| DE | 202007001157 | 4/2007 |
| EP | 1107210 | 6/2001 |

(Continued)

OTHER PUBLICATIONS

Wanco Mini-Matrix Message Director Solar Assisted Trailer, WVTM Technical Specification Mar. 3, 2010.*

(Continued)

*Primary Examiner* — Dylan White
(74) *Attorney, Agent, or Firm* — Avery Dennison Corporation

(57) ABSTRACT

A directionally active projection device is described that includes a planar display providing a pattern of information. The planar display includes regions of light transparency and regions for blocking light transmittance. The directionally active projection device also includes a lens arranged adjacent to the planar display, and a collection of light sources arranged as an array in a focal plane of the lens. Also described are methods of controlling directionally active projection devices.

28 Claims, 4 Drawing Sheets

(56) References Cited

U.S. PATENT DOCUMENTS

| | | | | |
|---|---|---|---|---|
| 2004/0012838 | A1 * | 1/2004 | Huibers | 359/291 |
| 2004/0183694 | A1 | 9/2004 | Bauer | |
| 2009/0202254 | A1 | 8/2009 | Majumdar et al. | |
| 2010/0097408 | A1 * | 4/2010 | Marcellinus et al. | 345/690 |
| 2010/0277696 | A1 * | 11/2010 | Huebner | 352/81 |
| 2010/0315813 | A1 * | 12/2010 | Fugerer et al. | 362/235 |
| 2011/0006997 | A1 * | 1/2011 | Porwal | 345/173 |

FOREIGN PATENT DOCUMENTS

| | | |
|---|---|---|
| EP | 2378327 | 10/2001 |
| GB | 1465061 | 2/1977 |
| JP | 2006132173 | 5/2006 |
| JP | 2010002650 | 1/2010 |
| WO | WO01/79320 | 10/2001 |

OTHER PUBLICATIONS

International Preliminary Report on Patentability issued in corresponding IA No. PCT/US2013/024967 dated Aug. 21, 2014.

International Search Report and Written Opinion issued in corresponding IA No. PCT/US2013/024967 dated Aug. 14, 2013.

* cited by examiner

DIRECTION ACTIVE PROJECTION

CROSS REFERENCE TO RELATED APPLICATION

The present application claims the benefit of U.S. Provisional Application No. 61/595,261 filed Feb. 6, 2012, which is incorporated herein by reference in its entirety.

FIELD

The present subject matter relates to signage, and more particularly to active signs capable of projecting dynamic information at mobile viewers.

BACKGROUND

Highways and surface streets are replete with signs providing a variety of information. Such information may include street/exit names, distance/instructions to destinations, traffic condition notices, traffic safety rules (including speed limits, lane changing, etc.), as well as possible advertising or other information.

Some traffic signs use active display signs, for example, to warn of traffic congestion, construction and accidents ahead on the highway, whereas the displayed information may be actively changed and/or updated. The information displayed may be pre-programmed and displayed without any feedback as to whether there are vehicles on the road with drivers to see and benefit from the information. This may result in needless power consumption. Furthermore, such signs often project the message with a Lambertian or other large solid angle illumination pattern that includes unnecessary projection to the road sides or vertically, where there is no need, since there are no viewing drivers or passengers in these directions to benefit from the information. Additional power may be wasted in such non-discriminating light projection.

There is a need, therefore, for active signage capable of projecting dynamically changeable information directed at approaching vehicles only when they are sensed.

SUMMARY

The difficulties and drawbacks associated with previously known systems are addressed in the devices and methods as follows.

Disclosed is an active sign including a means for detecting a location of one or more approaching vehicles, a planar means for displaying a fixed or changeable pattern on the basis of the approaching vehicle, and a means for actively directing the displayed pattern substantially in the direction of the vehicle on the basis of the detected position.

In one aspect, the present subject matter provides a directionally active projection device comprising a planar display means for displaying a pattern of information, wherein the planar means includes regions of transparency. The projection device also comprises a focusing means arranged adjacent to the planar display means. And, the projection device comprises a plurality of light source means arranged as an array in a focal plane of the focusing means.

In another aspect, the present subject matter provides a method of controlling a directionally active light projection device. The method comprises initializing a plurality of light sources located in a focal plane of a lens in an OFF state. The method also comprises detecting with a sensor associated with each light source an incident level of light. The method additionally comprises determining with circuitry coupling each light source to the corresponding associated sensor if the incident light level exceeds a threshold level. The method further comprises turning the light source ON to illuminate the lens if the incident light level detected by the associated sensor exceeds a threshold level. And, the method comprises turning the light source OFF if the incident light level detected by the associated sensor does not exceed a threshold level.

In yet another aspect, the present subject matter provides a directionally active projection device comprising a planar display providing a pattern of information. The planar display includes regions of light transparency and regions for blocking light transmittance. The device also comprises a lens arranged adjacent to the planar display. And, the device additionally comprises a plurality of light sources arranged as an array in a focal plane of the lens.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
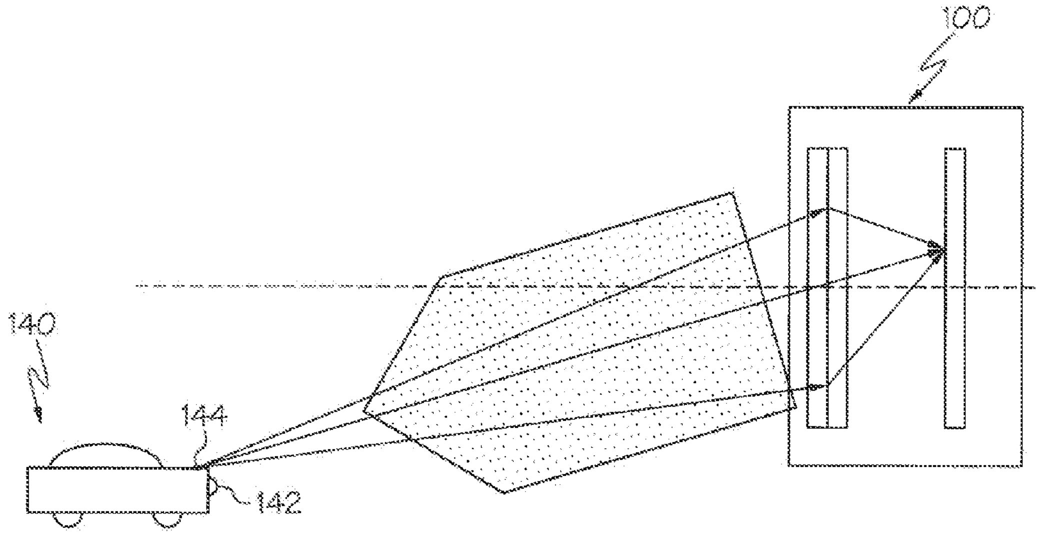
FIG. 1 is a representation of generic aspects common to possible embodiments of a sign adapted to project information toward a moving vehicle in accordance with the disclosure.

The detailed descriptions set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

The present subject matter provides a directionally active projection device comprising a planar display for displaying information or a pattern of information, one or more focusing components or lenses adjacent or proximate the planar display, and one or more light sources. In certain versions, the light sources are arranged as an array in a focal plane of the focusing elements(s).

Generally, the planar display includes regions of transparency and particularly, regions of light transmittance and regions for blocking light transmittance. The planar display can comprise a static display, a variable spatial light modulator, or combinations thereof. The spatial light modulator can comprise a liquid crystal display, and in particular versions a liquid crystal display light valve.

The focusing components or lenses can be provided in a variety of forms such as a planar Fresnel lens, a plano-convex lens (or plano-convex thin lens), and combinations thereof.

The light source(s) can include one or more light emitting devices.

The projection devices can also comprise additional components such as but not limited to one or more light sensors or light detectors, one or more light diffusers, and particular circuits or functional components as described herein.

The light sensors or detectors are generally arranged in accordance with the light source(s). The light sensors or detectors in certain versions, are electrically coupled or in electrical communication to one or more of the light sources. In particular versions, the light sensors or detectors are positioned away or spaced from a focal plane of the focusing components or lenses by a specified amount. In still other versions of the present subject matter, the light source(s) and the light sensor(s) or detector(s) are provided jointly or integral with one another in the same or common component, and hence are referred to herein as "the same." The light sensors or detectors can be configured to detect a level of light that is transmitted through the focusing components or lenses. In particular embodiments, the light sensor(s) or detector(s) is coupled to a circuit configured to determine if the level of light detected exceeds a threshold level. More specifically, the circuit can be configured to power the light source(s) to an ON state according to a specified response to the light sensor(s)/detector(s) to thereby illuminate the planar display and the focusing components or lenses if the level of light detected exceeds the threshold level. The circuit can also be configured to extinguish the light source(s) to an OFF or low intensity state according to a specified response to the light sensor(s)/detector(s) if the level of light detected does not exceed the threshold level.

The one or more light diffusers, if used, can be arranged with the planar display, the focusing component(s) or lenses, and/or the collection of light source(s).

The present subject matter also provides methods of controlling directionally active light projection devices. These methods include initializing one or more light sources generally located in a focal plane of a lens in an OFF state. The methods also include detecting with a sensor associated with each light source an incident level of light. The methods additionally include determining with circuitry coupling each light source to the corresponding associated sensor, if the incident light level exceeds a threshold level. The methods also include turning the light source ON to illuminate the lens if the incident light level detected by the associated sensor exceeds a threshold level, and turning the light source OFF if the incident light level detected by the associated sensor does not exceed a threshold level.

These and other aspects are further described as follows.

General features of the disclosed apparatus are described with respect to FIG. 1. A vehicle 140 may be approaching a road sign 100. The vehicle's presence may be made known by the headlights 142 of the vehicle illuminating the road or, alternatively, a beacon 144 emitting some form of electromagnetic radiation, in the form of infrared, radio frequency, radar, microwaves, visible light, or any suitable form of electromagnetic radiation. In various aspects described below, a sensor system as a physically distinct and separable component of the sign 100 may detect the location and distance of the vehicle 140. Alternatively, the sensor system may be imbedded within the road sign 100 as described below.

Figure 2:
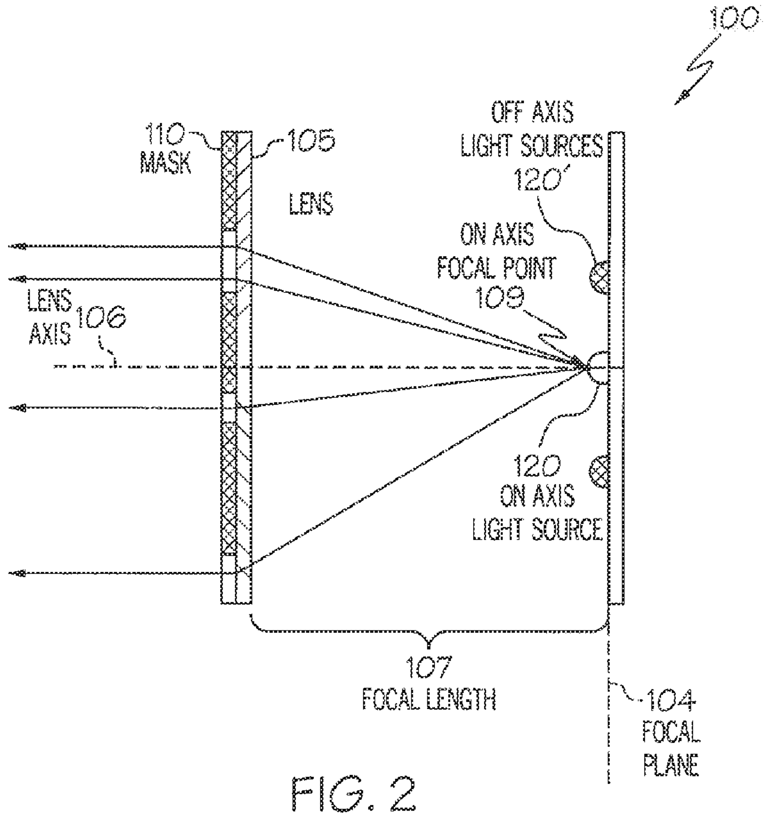
FIG. 2 shows a first aspect of an apparatus for directionally projecting information on axis from a sign in accordance with the disclosure.

In an aspect of the disclosure as illustrated in FIG. 2, the road sign 100 includes a mask 110. The mask 110 may be a passive film transparency including, for example, directions, distance information, and graphics. The transparency may provide, as is typical of many road signs, a uniform background color, and information in a contrasting illumination. If the back lighting is white, for example, the film transparency may include a dark background with white letters. The film transparency may include color regions so that letters may appear in various colors when backlit by white light. Alternatively, the film transparency background may be clear, providing white background, and the letters may be dark and/or in colors.

Alternatively, the mask 110 may be an active spatial light modulator, such as a liquid crystal display (LCD) screen. In this case, the sign may change dynamically to provide changing information, such as traffic condition and hazard information. If the backlighting is white, the mask 110 may provide color transparency and dark and/or brightness contrasting background.

Adjacent to the mask 110 may be included a lens 105. The lens 105 may preferably be a Fresnel type lens, which is a thin sheet form of lens well known in the art. Alternatively, the lens 105 may be a thin lens, preferably a plano-convex lens. Referring to a Fresnel type lens, the lens 105 may be placed adjacent to the mask 110 in close proximity. In one aspect of the disclosure, the lens 105 and mask may be bonded together with, for example, an optical cement, such that the refracting properties embossed on one surface of the lens 105 are not affected, and may preferably be arranged on the surface of the lens not contacting the mask. In the case of the plano-convex lens, the mask may be preferably bonded to the planar side of the plano-convex lens. The lens 105 has an optical axis 106 perpendicular to the plane of the lens 105 and passing through the center of the lens 105. The lens is characterized by a focal length 107, and parallel rays of light passing through the lens 105 parallel to the lens axis 106 will converge at a focal point 109 located in a focal plane 104 at the distance of the focal length 107 from the plane of the lens 105. Conversely, light originating as a point source at the focal point 109 on the lens axis 106 will emerge from a far side of the lens 105 as rays collimated parallel to the optical axis 106.

The light source 120 may be a single element light emitter, such as a high brightness light emitting diode (LED), or an equivalent light emitter. In such case, as an approximation to a point source, collimated rays will be projected. Alternatively, the light source may be a cluster of light emitters, in which case the projected rays will only be approximately collimated, and will have a divergence angle determined by well known optical rules.

By either placing the mask 110 between the lens 105 and the on axis light source 120 or placing the lens 105 between the mask 110 and the on axis light source 120, substantially the same effect of transmitting a beam of substantially parallel rays of light filtered by the pattern of the mask 110 will be achieved.

Figure 3:
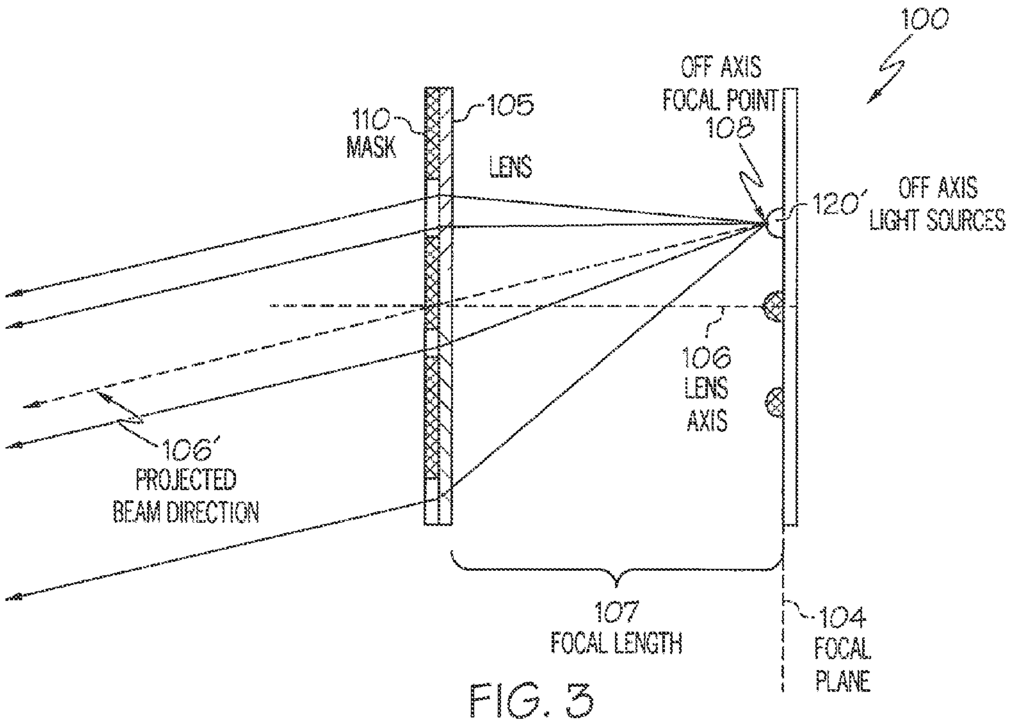
FIG. 3 shows a second aspect of an apparatus for directionally projecting information off axis from a sign in accordance with the disclosure.

The road sign 100 may further have one or more light sources 120' arranged in the focal plane 104 offset from the optical axis, as illustrated in FIG. 3. If the light source 120' illuminates the mask 110 and lens 105 while the on axis light source 120 is off, then a beam of light rays will emerge from the far side of the lens 105 and mask 110 directed at an angle to the optical axis 106, now parallel to the projected beam direction 106'. Thus, the projected beam, filtered by the mask 110, may be steered and directed as a substantially collimated beam depending on which light sources 120, 120' are turned on to illuminate the mask 110 and lens 105. The road sign 100 will then appear illuminated by a viewer located within the collimated beam of projected light.

It may be readily appreciated that a plurality of beams may be formed to project the image of the mask 110 in multiple directions simultaneously by turning on a plurality of light sources 120, 120', and thus the road sign may be selectively viewed with best illumination by a plurality of viewers, where each viewer is located within one of the plurality of collimated beams of the projected mask. By arranging the plurality of light sources 120, 120' in an array at the focal plane 104 of the road sign 100, the image on the mask 110 may be projected in a plurality of directions, depending on which of the light sources 120, 120' are turned on to illuminate the mask 110 and lens 105.

Figure 4:
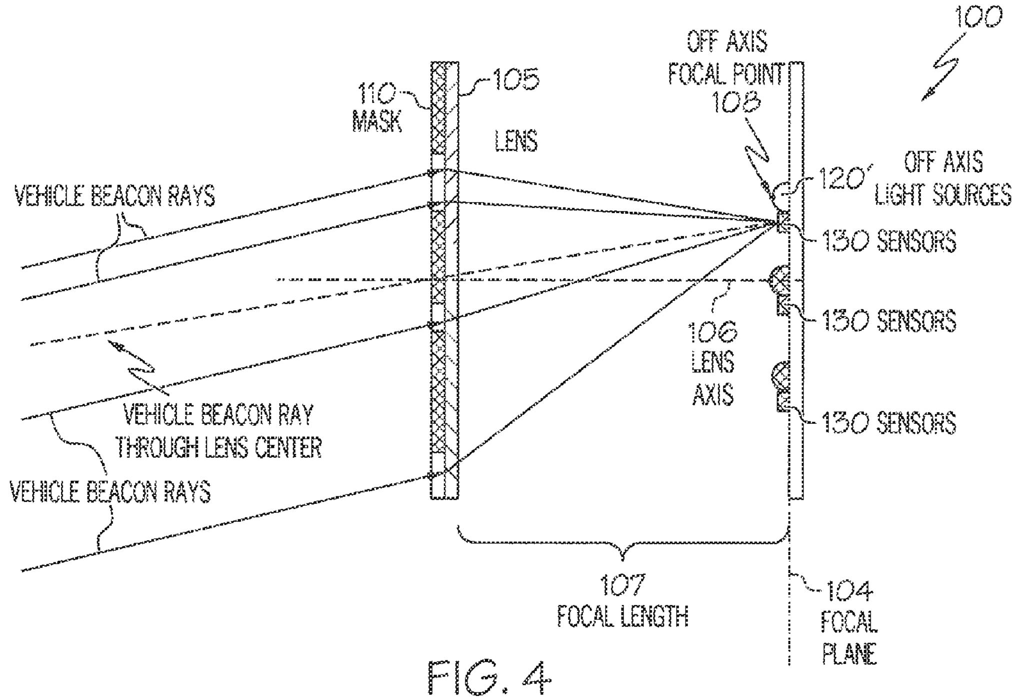
FIG. 4 shows a third aspect of an apparatus for directionally projecting information off axis from a sign in accordance with the disclosure.

FIG. 4. shows a beam from a beacon 144 or headlight 142 of the vehicle 140 (as depicted in FIG. 1) in proximity to the road sign 100, being detected by one or more sensor(s) 130 adjacent to the light source 120', in a further aspect of the disclosure. The light intensity from the beacon or headlight can be constant, or modulated temporally to transmit information from the vehicle to the sign. For example, information about facilities, e.g. gas stations, restaurants, hotels, tourist attractions, etc., can be transmitted to the automobile in order that the occupants of the vehicle can make a decision as to whether to stop at the particular exit. In addition, the information transmitted can contain details concerning road conditions, weather alerts, construction closures or provide alternate route suggestions to avoid congestion ahead. The information that is transmitted to the vehicle can also be used to market particular products or services, whether related to the vehicle such as its maintenance or a particular advertising campaign being sponsored by a marketer of that product or service. The occupants of the vehicle may also be given options to select that are contained in the information transmitted and then based on the selection of a particular portion of the information the occupants may be provided with more specific information or be redirected to a website that may be accessible via the vehicle's on board navigation or entertainment system.

At sufficient distance from the road sign, light from the beacon 144 or headlight 142 may be represented as a collimated or narrowly diverging beam. Therefore, the rays of light approaching the road sign 100 are approximately parallel. In consequence, light from the vehicle 140 will be focused at the focal plane at some location which may be off the optical axis 106 of the lens 105. A sensor 130 may be placed adjacent to each respective light source 120, 120' in the focal plane 104. Furthermore, each respective pair of sensor 130 and light source 120, 120' may be electrically coupled so that the light source 120, 120' is turned on only when the sensor detects an amount of light intensity above a triggering threshold level. That way, only those light sources 120, 120' will turn on and illuminate the mask 110 when their corresponding sensors 130 detect a signal from an approaching vehicle with a beacon 144 or headlight 142. As each of the vehicles move, a different set of light source/sensor pairs may be activated and the projected mask images follow the vehicles 140. Thus, control of the road sign image direction projection to a plurality of vehicles is managed at a highly distributed and simple level of processing. That is, the light output of each light source 120, 120' is controlled by the light input detected by the associated sensor 130. Multiple vehicles are automatically tracked and illuminated.

It may be appreciated that the road sign 100 may be dark and not consume any energy beyond that needed to operate the sensor circuitry needed to turn on light sources 120, 120'. Furthermore, light is efficiently directed toward vehicles with beacons 144 or headlights 142, reducing an overall energy requirement for illumination.

The beacon 140 is detected by sensors imbedded or associated with the road sign 100. The road sign 100 may further include a light source, which illuminates an included light transmission mask and a lens. The light source may include one or more light emitting devices which may be independently or collectively turned on to illuminate the light transmission mask and the lens. The light emitted from these devices can be constant, or modulated temporally to transmit information from the sign to the vehicle. The information that is transmitted may be converted into an audible signal such that driver or occupants of the vehicle have the indicia contained on the sign read or annunciated to them. The vehicle occupants may get additional audible details upon making a selection if one is presented thereby allowing the users to hear what options or entertainment may be available in the immediate vicinity. The information contained in the light source may also be retrievable via a smart device such as a smart phone, tablet or the like.

The lens may be a single lens or an array of lenses, where an optical axis is defined with respect to a center of the lens or each lens. The optical axis of each lens may preferably be parallel to all other lenses. The lens may be a Fresnel type lens, either as a singlet or an array of Fresnel lenses. In the case where arrays of lenses are used, a corresponding array of sources or source arrays with their associated electronics may be used. The mask may be a passive light transmission mask with regions of light transmission of various colors and regions of opacity, in order to provide a display with information that may include words and/or graphics. The mask may be an active spatial light modulator, such as a liquid crystal display, in which case the image displayed on the mask may change under control of an image display controller. In certain embodiments, the spatial light modulator includes one or more liquid crystal light valves. The mask may also be in the form of a static display.

Figure 5:
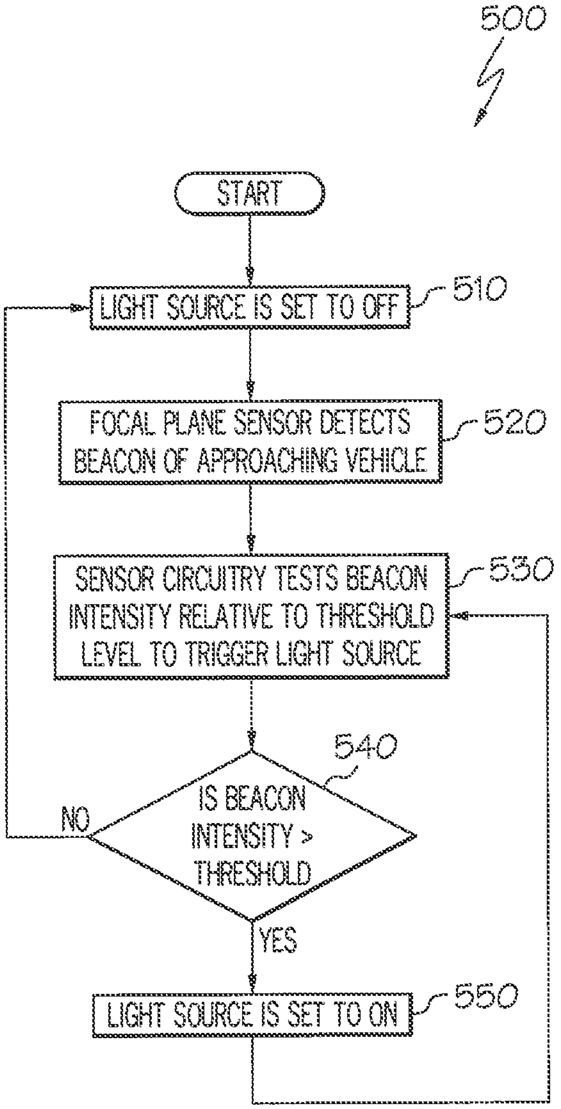
FIG. 5 shows an aspect of a method of directionally projecting information from a sign to one or more vehicles in accordance with the disclosure.

In operation, a method 500, as illustrated in FIG. 5, begins with the light source 120 set to OFF, i.e., without power to provide illumination (process block 510)), or with a dimmed background level of power deemed appropriate for the absence of vehicle beacons or headlights. In process block 520, the sensor 130 may receive light energy arriving from the vehicle beacon 144 or headlight 142. In process block 530 circuitry coupling the light source 120 and the sensor 130 tests the detected beacon intensity relative to a pre-determined threshold value required to trigger an ON state for the light source. In decision block 540, if the detected intensity is not greater than the threshold, the decision is NO, and the method continues at process block 510. If the beacon intensity exceeds the threshold, the light source is set to ON in process block 550, illuminating the lens 105 and mask 110, and the method continues at process block 530, where the signal intensity of the beacon 144 is tested for changes relative to the threshold.

Figure 6:
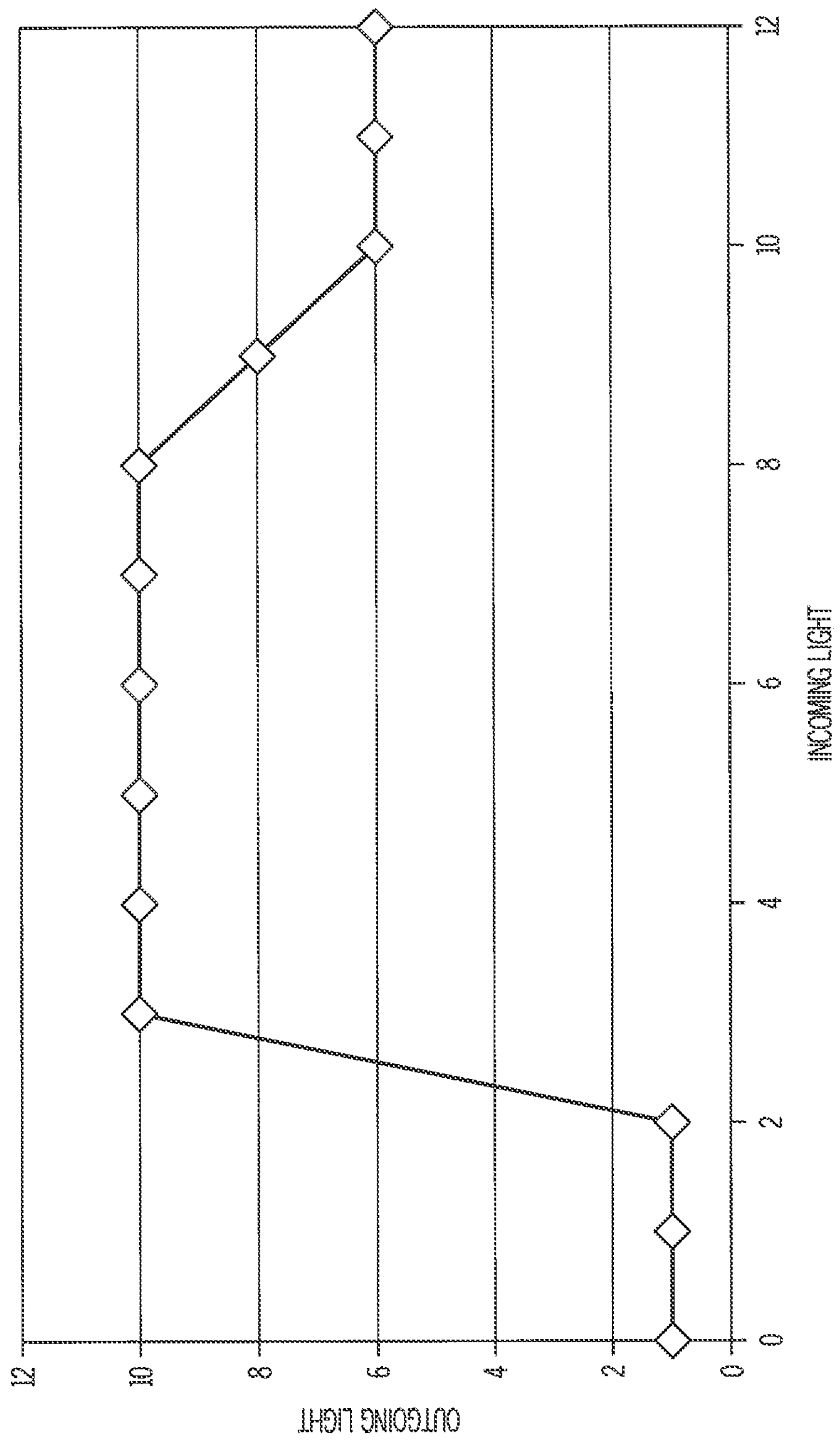
FIG. 6 shows an example of programmable sign luminance as a function of incoming light intensity from one or more approaching vehicles in accordance with the disclosure.

In another aspect of the disclosure, instead of implementing a simple binary function as described above, a more complex illumination response function relating the amount of incoming light from approaching vehicles to the amount of outgoing sign illumination light may be implemented. For example, the function shown in FIG. 6 may be implemented to alter the sign luminance as a function of light intensity arriving from approaching vehicles. Other such functions can be envisioned for various purposes. For example, the outgoing luminance could be made alternately dimmer and brighter as the vehicle approaches (and hence the incoming light becomes brighter). Modulation of the illumination in this way may be used, for example, to signal notification of a potentially hazardous situation ahead.

In another aspect of the disclosure, in order for the sign to appear uniformly illuminated, the light from each LED may preferably uniformly illuminate the Fresnel lens/mask. This may be implemented with an appropriate lens on the front of each LED, or a continuous lens array sheet in front of the LED array, for example.

In a further aspect of the disclosure, it may be preferable for the sign illumination to vary smoothly as the source of the beacon moves. Furthermore, if all the LEDs are illuminated, it may be preferable to have a smooth angular distribution of light emerging from the sign, without gaps. Effectively, it is preferred in this case to converge incoming parallel light to a spot size on the sensor plane equal to or greater than the sensor spacing (or LED spacing). This may be accomplished by a combination of the Fresnel lens characteristics, characteristics of the graphics film (mask), positioning the LED array slightly out of the focal plane, and the possible insertion of a diffusing film somewhere in the optical path.

In another aspect of the disclosure, one or more of the LEDs of the light source may also function as light sensors using circuitry to switch a voltage biasing the LED—forward biasing for light emission, reverse biasing for light sensing. Techniques such as, but not limited to, pulse width modulation (PWM) may be employed to set the illumination level depending on the sensed light in the reverse bias sensing mode.

Many other benefits will no doubt become apparent from future application and development in this technology.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to previous or other aspects. Thus, the claims are not intended to be limited to the aspects shown herein, but is to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase “means for” or, in the case of a method claim, the element is recited using the phrase “step for.”

What is claimed is:

1. A directionally active projection device comprising:

a planar display means for displaying a pattern of information, wherein the planar means includes regions of transparency, wherein the planar display means comprises a planar transparency including regions of light transmittance and regions for blocking light transmittance;

wherein the planar display means comprises a variable spatial light modulator;

a focusing means arranged adjacent to the planar display means; and a plurality of light source means arranged as an array in a focal plane of the focusing means, wherein the plurality of light source means are both on an optical axis of the focusing means and offset from the optical axis.

2. The device of claim 1, wherein the focusing means comprises at least one of a planar Fresnel lens and a plano-convex lens.

3. The device of claim 1, wherein the planar display means comprises a static display means.

4. The device of claim 1, wherein the spatial light modulator comprises a liquid crystal display.

5. The device of claim 1, wherein each of the plurality of light source means comprises one or more of a light emitting device.

6. The device of claim 1, further comprising a diffusing means arranged with the planar display means, the focusing means and the plurality of light source means.

7. The device of claim 1, wherein a light sensing means is electrically coupled to at least one of the light source means.

8. The device of claim 7, wherein the light sensing means is positioned away from a focal plane of the focusing means by a specified amount.

9. The device of claim 7, wherein the light source and the light sensing means are the same.

10. The device of claim 7, wherein the light sensing means is adapted to detect a level of light transmitted through the focusing means.

11. The device of claim 7, wherein the light sensing means is coupled to a circuit configured to determine if the level of light detected exceeds a threshold level.

12. The device of claim 11, wherein the circuit is configured to power the light source means to an ON state according to a specified response to the light sensing means to illuminate the planar display means and the focusing means if the level of light detected exceeds the threshold level.

13. The device of claim 11, wherein the circuit is configured to extinguish the light source means to an OFF or low intensity state according to a specified response to the light sensing means if the level of light detected does not exceed the threshold level.

14. A method of controlling a directionally active light projection device, comprising:

initializing a plurality of light sources located in a focal plane of a lens in an OFF state; wherein one or more light sources are arranged both on an optical axis of the lens and offset from the optical axis;

detecting with a sensor associated with each light source an incident level of light;

determining with circuitry coupling each light source to the corresponding associated sensor if the incident light level exceeds a threshold level;

turning the light source ON to illuminate the lens if the incident light level detected by the associated sensor exceeds a threshold level; and turning the light source OFF if the incident light level detected by the associated sensor does not exceed a threshold level.

15. The method of claim 14, wherein the light source and the sensor are the same.

16. A directionally active projection device comprising:

a planar display providing a pattern of information, wherein the planar display includes regions of light transparency and regions for blocking light transmittance, wherein the planar display comprises a variable spatial light modulator;

a lens arranged adjacent to the planar display; and a plurality of light sources arranged as an array in a focal plane of the lens, wherein the plurality of light source means are both on an optical axis of the focusing means and offset from the optical axis.

17. The device of claim 16, wherein the lens comprises at least one of a planar Fresnel lens and a plano-convex thin lens.

18. The device of claim 16, wherein the planar display comprises a static display.

19. The device of claim 16, wherein the spatial light modulator comprises a liquid crystal display light valve.

20. The device of claim 16, wherein each of the light sources comprises one or more light emitting devices.

21. The device of claim 16, further comprising a light diffuser arranged with the planar display, the lens and the plurality of light sources.

22. The device of claim 16, further comprising a light detector arranged with and electrically coupled to each respective light source.

23. The device of claim 22, wherein the light detector is positioned away from a focal plane of the lens by a specified amount.

24. The device of claim 22, wherein the light source and the light detector are the same.

25. The device of claim 22, wherein the light detector is adapted to detect a level of light transmitted through the lens.

26. The device of claim 22, wherein the light detector is coupled to a circuit configured to determine if the level of light detected exceeds a threshold level.

27. The device of claim 26, wherein the circuit is configured to power the light source to an ON state according to a specified response to the light detector to illuminate the planar display and the lens if the level of light detected exceeds the threshold level.

28. The device of claim 26, wherein the circuit is configured to extinguish the light source to an OFF or low intensity state according to a specified response to the light detector if the level of light detected does not exceed the threshold level.

* * * * *